Figure 1:
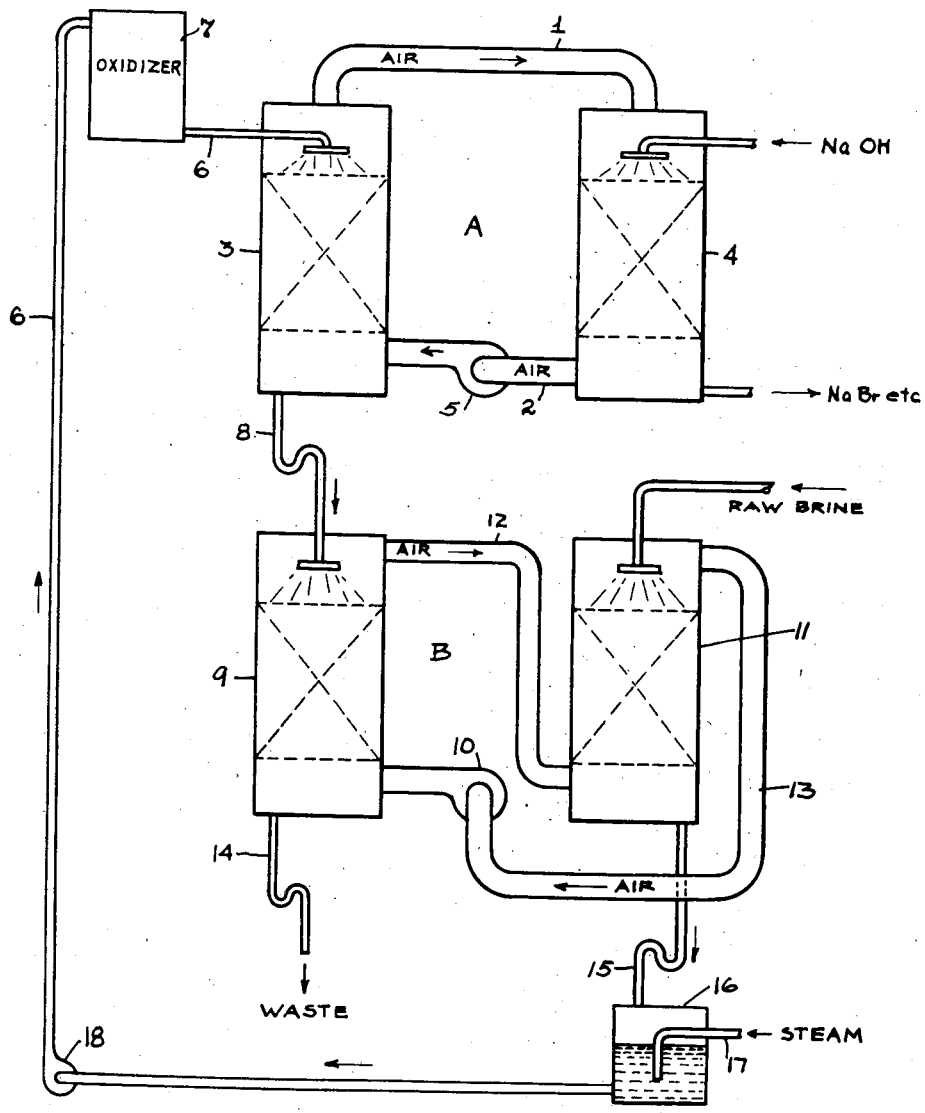

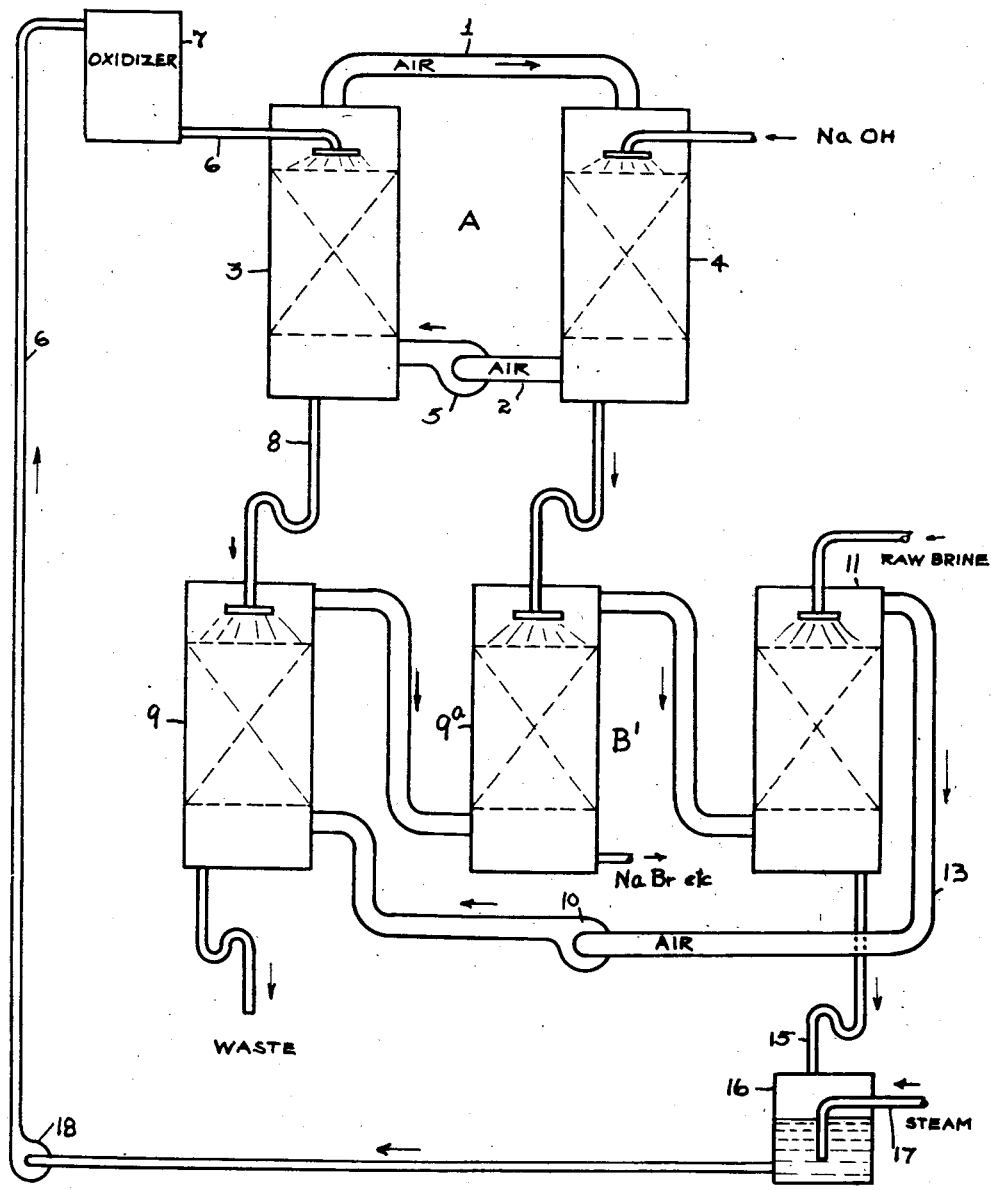

Patented Jan. 18, 1927.

1,614,663

UNITED STATES PATENT OFFICE.

HERBERT H. DOW AND EDWIN O. BARSTOW, OF MIDLAND, MICHIGAN, ASSIGNORS TO THE DOW CHEMICAL COMPANY, OF MIDLAND, MICHIGAN, A CORPORATION OF MICHIGAN.

RECOVERY OF BROMINE.

Application filed September 20, 1924. Serial No. 738,820.

The present improved process and apparatus for carrying on the same relate to the method of recovering or extracting minute amounts of bromine from salt brines originally disclosed in U. S. Patent Reissue No. 11,232, issued to H. H. Dow under date of April 12, 1892. According to this patent, the natural brine, in which the trace of bromine is present in the form of bromide, is treated to set the bromine free from its chemical combination, then the freed bromine is separated from the brine by means of an air blast, and finally such bromine is absorbed from the air with suitable absorbing material.

In dealing, however, with brines containing a very small quantity of the halogen, for example a brine in which the amount of bromine is of the order of magnitude of 1 lb. per 10 tons of water, it becomes necessary in the conduct of the aforesaid Dow method to heat the brine before the bromine can be blown out after being set free from its chemical combination. The heating of such a quantity of water in the ordinary manner makes recovery of the small amount of bromine involved uneconomical and furthermore, the brine itself, as well as the liberated halogen, are very corrosive in their effects upon metallic surfaces, especially when such surfaces are heated.

The object of the present invention, accordingly, is to provide an improved process and suitable apparatus for carrying on same wherein the heat is used regeneratively or over and over again, so that only certain relatively small radiation losses have to be made up. The process and apparatus are furthermore so designed as to eliminate the use of metallic heating surfaces in the latter.

To the accomplishment of the foregoing and related ends, the invention, then, consists of the means and steps hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:—

Fig. 1 there appearing represents diagrammatically a form of apparatus suitable for use in carrying out our present improved process; and Fig. 2 illustrates a modification.

In the apparatus thus illustrated, the air used in blowing out the freed bromine from the brine in which it is absorbed is contained in a closed circuit A, i. e. it is used over and over again. This circuit, in addition to suitable conduits 1 and 2, includes a so-called blow-out tower 3 and an absorption tower 4. The air is circulated by means of a suitable pump 5 in the proper direction to pass upwardly through said first named tower and downwardly through the latter, while the brine is supplied from a source, as will be presently explained, to the top of said blow-out tower so as to move in a direction opposite to that of the air passing therethrough. It will be understood, of course, that the brine, which is supplied to said tower 3 through a duct 6, has been previously oxidized, i. e., treated chemically or electrolytically in a chamber 7 interposed in the pipe line so as substantially entirely to free the bromine from its chemical combination.

In this circuit A, the temperature of the oxidized brine, of the air, and of the absorbing liquid, for example caustic soda, NaOH, used in absorption tower 4, will be the same and this temperature will be designated T'. The blown brine, i. e., the brine which has been exhausted with respect to the freed bromine present therein, leaves circuit A after passing through blow-out tower 3, such brine being conducted through a trapped line 8 to the top of a spray tower 9 which forms part of a second closed circuit B. This spray tower 9 acts as a heat interchanger, the brine, which thus enters the same being at temperature T' as aforesaid, being therein brought into contact with a given body of air which is circulated by means of a pump 10 through said tower and another tower 11 connected therewith by means of ducts 12 and 13. Said tower 11, which is also a spray tower, is supplied at the top with raw brine, duct 12 leading from the top of tower 9 to the bottom of said tower 11 so that the air will pass upwardly through both towers.

As a result of the circulation of the air through these two towers, the heat absorbed thereby from the spent brine passing through tower 9 is immediately liberated in tower 11 where such heat is taken up by the raw brine, the latter entering at a lower temperature T than the temperature T' of such spent brine. As a result of the foregoing, the raw brine by the time it passes through tower 11 is brought nearly, although not quite, to the temperature T', while the air leaving said tower has similarly had its temperature reduced nearly to that of the raw brine. The air in its circuit now passes up through tower 9 where it is again heated to temperature T' and so on, in this way repeatedly performing the function of transferring heat from the spent brine to the raw brine.

The spent brine from tower 9 with its temperature reduced nearly to T is discarded through a trapped connection 14, while the raw brine from tower 11 with its temperature raised nearly to T' flows through a trapped connection 15 to a chamber 16 where its temperature is brought up entirely to T' by steam supplied from an outside source through a pipe 17. Such steam or equivalent means thus makes up any heat losses incurred by radiation from the system or otherwise. The raw brine now at temperature T' is transferred by means of a pump 18 through line 6 and interposed oxidizer 7 to the top of blow-out tower 3.

While circuit A represents the simplest form of circuit for the above purpose, it will of course be evident that any of the more elaborate circuits, such for example as the ones described in U. S. Patents Nos. 741,637, 752,286 and 1,323,173 to H. H. Dow, may be used if desired without affecting the advantageous results obtained by our present improved heat interchanging or regenerating system. It will further be noted that inasmuch as the absorption tower 4 is at the same temperature T' as the brine in this circuit, the absorption liquid which, as previously indicated, will usually consist of a solution of sodium hydroxide, NaOH, can be circulated through tower 9 instead of the brine from said circuit A; or the brine and the absorbing liquid can each be circulated through separate circuits similar to circuit B.

It is usual to refer to the step in the general process whereby the bromine is freed from its chemical combination in the brine, e. g., from the bromide in the form in which it there occurs, as an oxidizing step and the apparatus in which this step is carried on may hence be appropriately termed an oxidizer. It will also be understood that any other equivalent neutral gaseous medium may be used in place of air in either or both of the closed circuits A and B. The several towers that are included in the respective circuits just named will be constructed of non-metallic materials. In other words, both the walls and the filler employed therein will be made of refractory material such as is ordinarily used with an agent of the corrosive character of the brine of the present process both before and particularly after it has been treated to free the bromine. By means of the heat interchanging system employed which we have devised, the use of metallic heating surfaces is rendered unnecessary.

Other modes of applying the principle of our invention may be employed instead of the one explained, change being made as regards the means and the steps herein disclosed, provided those stated by any one of the following claims or their equivalents be employed.

We therefore particularly point out and distinctly claim as our invention:—

1. In a process of extracting bromine from brine containing a bromine compound, the steps which consist in treating such brine so as to free the bromine from its chemical combination; separating the freed bromine from such treated brine at a suitable elevated temperature by means of a current of air; and utilizing the treated brine to heat fresh brine for use in the process.

2. In a process of extracting bromine from brine containing a bromine compound, the steps which consist in treating such brine so as to free the bromine from its chemical combination; separating the freed bromine from such treated brine at a suitable elevated temperature by means of a current of air; and bringing a suitable gaseous medium in successive heat exchange relation with the residual treated brine and with fresh brine, whereby the latter is heated for use in the process.

3. In a process of extracting bromine from brine containing a bromine compound, the steps which consist in treating such brine so as to free the bromine from its chemical combination; separating the freed bromine from such treated brine at a suitable elevated temperature by means of a current of air; and bringing another current of air in successive contact with the residual treated brine and with fresh brine, whereby the latter is heated for use in the process.

4. In a process of extracting bromine from brine containing a bromine compound, the steps which consist in treating such brine so as to free the bromine from its chemical combination; separating the freed bromine from such treated brine at a suitable elevated temperature by means of a body of air, such air flowing in a closed circuit; absorbing the bromine in the air at one point in such circuit; and utilizing the treated brine to heat fresh brine for use in the process.

5. In a process of extracting bromine from brine containing a bromine compound, the steps which consist in treating such brine so as to free the bromine from its chemical combination; separating the freed bromine from such treated brine at a suitable elevated temperature by means of a body of air, such air flowing in a closed circuit; absorbing the bromine in the air at one point in such circuit; and bringing in suitable gaseous medium flowing in a closed circuit in successive contact with the residual treated brine and with fresh brine, whereby the latter is heated for use in the process.

6. In a process of extracting bromine from brine containing a bromine compound, the steps which consist in treating such brine so as to free the bromine from its chemical combination; separating the freed bromine from such treated brine at a suitable elevated temperature by means of a body of air; and bringing another body of air counter currently in heat exchange relationship with residual treated brine and with fresh brine, whereby the latter is heated for use in the process.

7. In a process of extracting bromine from brine containing a bromine compound, the steps which consist in treating such brine so as to free the bromine from its chemical combination; separating the freed bromine from such treated brine at a suitable elevated temperature by means of a body of air, such air flowing in a closed circuit; absorbing the bromine in the air at one point in such circuit; and bringing another body of air flowing in a closed circuit in successive contact with the residual treated brine and with fresh brine, whereby the latter is heated for use in the process, the air in such last-mentioned circuit flowing in a direction counter to that of both the treated and the fresh brine.

Signed by us this 17th day of September, 1924.

HERBERT H. DOW.
EDWIN O. BARSTOW.